(12) United States Patent
Hörlendsberger

(10) Patent No.: US 10,029,710 B2
(45) Date of Patent: Jul. 24, 2018

(54) ILLUMINATION OF VEHICLE DOORS

(71) Applicant: KNORR-BREMSE GMBH, Modling (AT)

(72) Inventor: Christian Hörlendsberger, Österreich (AT)

(73) Assignee: KNORR-BREMSE GMBH (AT)

(*) Notice: Subject to any disclaimer, the term of this patent is extended or adjusted under 35 U.S.C. 154(b) by 47 days.

(21) Appl. No.: 15/300,628

(22) PCT Filed: Mar. 17, 2015

(86) PCT No.: PCT/AT2015/050067
§ 371 (c)(1),
(2) Date: Sep. 29, 2016

(87) PCT Pub. No.: WO2015/149095
PCT Pub. Date: Oct. 8, 2015

(65) Prior Publication Data
US 2017/0113704 A1 Apr. 27, 2017

(30) Foreign Application Priority Data
Mar. 31, 2014 (AT) .............................. GM50049/2014

(51) Int. Cl.
*B61D 29/00* (2006.01)
*B61D 19/00* (2006.01)
(Continued)

(52) U.S. Cl.
CPC ............ *B61D 29/00* (2013.01); *B60Q 1/2669* (2013.01); *B61D 19/008* (2013.01);
(Continued)

(58) Field of Classification Search
CPC .... B61D 29/00; B61D 19/008; B61D 19/009; B60Q 1/2669; F21V 23/003
See application file for complete search history.

(56) References Cited

U.S. PATENT DOCUMENTS 5,142,823 A * 9/1992 Brandenburg ........... B60J 5/062
49/118
5,263,280 A * 11/1993 Dilcher ................ B61D 19/009
49/212

(Continued)

FOREIGN PATENT DOCUMENTS

DE 102010004116 A 7/2011
DE 102010019764 A1 11/2011
(Continued)

OTHER PUBLICATIONS

Enomoto, Apr. 19, 2007, JP2007099041A, Machine English Translation by Advanced Industrial Property Network (AIPN) by JPO, pp. 1-3.*

(Continued)

*Primary Examiner* — Alan Cariaso
(74) *Attorney, Agent, or Firm* — Barnes & Thornburg LLP

(57) ABSTRACT

The invention relates to the illumination of doors of vehicles, in particular of pivot and slide doors of rail vehicles, having a door frame, having at least one door leaf, and having at least one lighting means in the door region. In order to improve the lighting and to protect the lighting means there is provision that the lighting means is arranged on the door frame at a location which is at least essentially covered by the door leaf in the closed state of the door. The lighting means is preferably an LED, particularly preferably an LED strip or LED chain which is arranged in a groove in the door frame. The lighting means is advantageously activated by means of the door controller and/or the light controller of the vehicle.

12 Claims, 5 Drawing Sheets

(51) Int. Cl.
*B60Q 1/26* (2006.01)
*F21V 23/00* (2015.01)
*F21Y 115/10* (2016.01)
*F21Y 113/13* (2016.01)
*F21W 107/10* (2018.01)

(52) U.S. Cl.
CPC ....... *F21V 23/003* (2013.01); *F21W 2107/10* (2018.01); *F21Y 2113/13* (2016.08); *F21Y 2115/10* (2016.08)

(56) References Cited

U.S. PATENT DOCUMENTS 8,584,809 B2 * 11/2013 Sun .................. B66B 13/26 187/316
8,833,524 B2 * 9/2014 De Coi .................. B66B 13/26 187/316

FOREIGN PATENT DOCUMENTS

| | | | |
|---|---|---|---|
| EP | 1533205 | A1 | 5/2005 |
| JP | 2007099041 | A | 4/2007 |
| JP | 2007230380 | A | 9/2007 |
| JP | 2013116735 | A | 6/2013 |
| WO | 2013006848 | A2 | 1/2013 |

OTHER PUBLICATIONS

Broecker, Jul. 14, 2011, Description DE102010004116A1, Patent Translate Powered by EPO and Google, pp. 1-5.*
Search report for International Patent Application No. PCT/AT2015/050067, dated Jun. 18, 2015.
Austrian Office Action in corresponding application GM 50049/2014, dated Nov. 13, 2014.

* cited by examiner

ILLUMINATION OF VEHICLE DOORS

PRIORITY CLAIM

This patent application is a U.S. National Phase of International Patent Application No. PCT/AT2015/0250067, filed 17 Mar. 2015, which claims priority to Austrian Patent Application No. GM50049/2014, filed 31 Mar. 2014 the disclosure of which are incorporated herein by reference in their entirety.

FIELD

Disclosed embodiments relate to the illumination of doors of vehicles, in particular of rail vehicles for the transport of people.

BACKGROUND

In the case of modern vehicles, in particular passenger carriages of railways, rapid transit railways or underground railways, it is endeavored for visual reasons and for practical reasons, to achieve an outer side wall surface which is as smooth as possible continuously and is also visually uniform. This leads, when the train enters the station, to the doors not being readily identifiable and therefore firstly to the doors not being released for exit by the waiting passengers and secondly the latter having to make a certain search effort to establish where the doors are located. Added to this is the fact that, in spite of platform illumination becoming ever better in recent years, the region of entry into the carriage itself, in particular in the case of swinging-sliding doors, is illuminated relatively poorly since both the lighting means from the platform and the lighting means from the interior of the train are only poorly able to cover this region simply for geometrical reasons. Added to this is also the fact that the people using the entry prevent the light, which generally comes obliquely from above, from the carriage or from the platform from reaching the ground region; that is, they pass through their own shadow.

SUMMARY

There is therefore a need for illumination of the transitions and entrances, in which the lighting means are in particular not subject to shadowing, but also as far as possible do not dazzle, and in which they do not protrude beyond the external contours of the vehicle and do not interrupt the smooth outer wall, wherein the lighting means are intended not to reduce the light space profile, the free cross section, of the open door and to be accommodated so as to be as protected as possible against vandalism and damage.

It is the object of the disclosed embodiments to specify an illumination of this type.

The disclosed embodiments provides such an illumination system in accordance with the features of the characterizing part by providing, in other words, one or more LEDs on or in profiles which are part of the portal frame and, in the closed state of the door, are at least mostly concealed by the door, and may be activated via the door controller or another controller. The effect is therefore achieved that the lighting means are very substantially protected against vandalism, soiling and unwanted damage, they can also be easily retrospectively installed and, together with possible coverings, can easily be adapted to the installation situation in such a manner that they do not dazzle the passengers.

Every door, with modification this also applies to what are referred to as pocket doors, covers parts of the door frame in the closed state and opens up the parts in the open state, e.g., before the beginning of the opening movement and up to the end of the closing movement. According to the disclosed embodiments, the lighting means are mounted in the regions, the lighting means, for example being a plurality of LEDs which can be operated virtually without maintenance, for a long service life, cost-effectively, mechanically stably and with little energy.

BRIEF DESCRIPTION OF THE FIGURES

Disclosed embodiments are explained more specifically below with reference to the accompanying drawings, in which.

DETAILED DESCRIPTION

Figure 1:
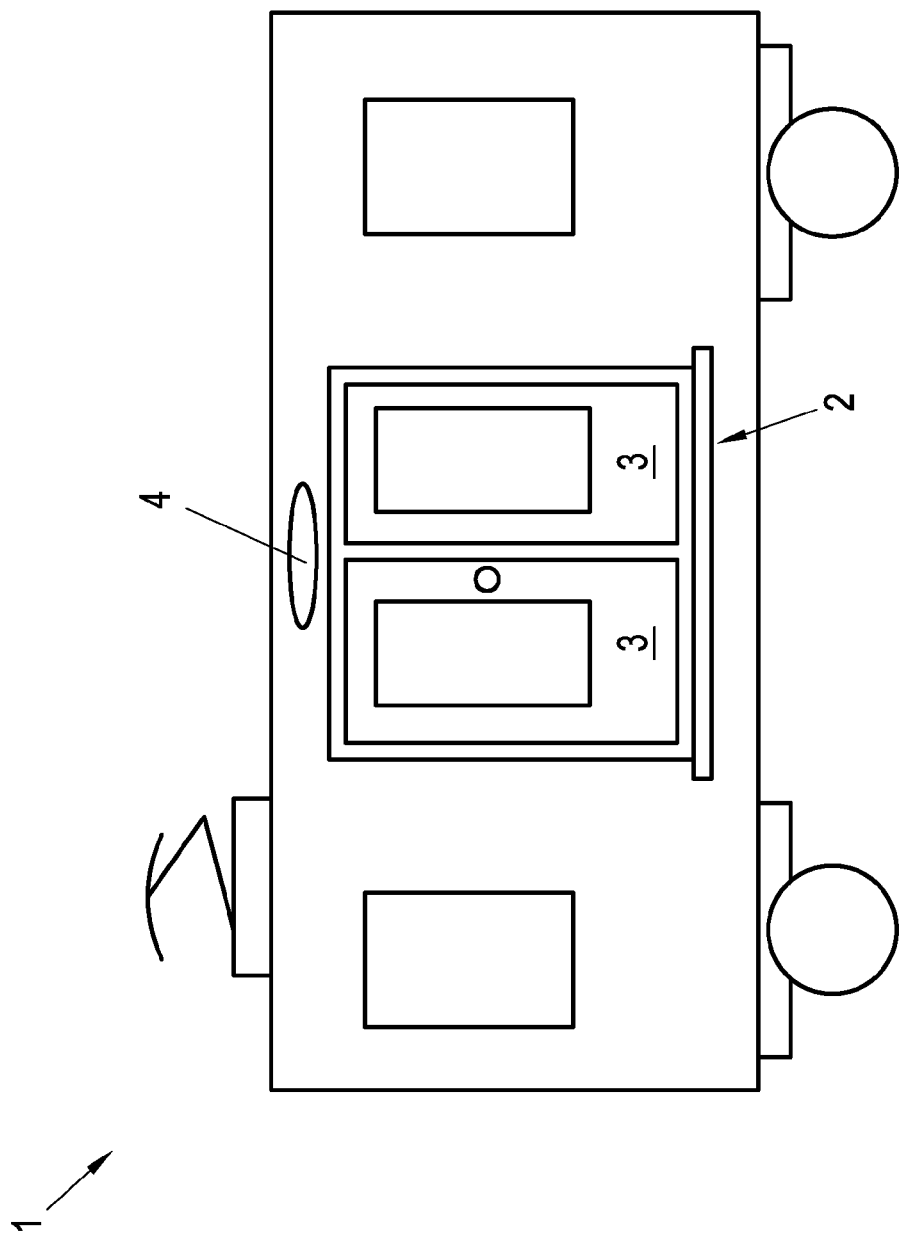
FIG. 1 shows a side view of a rail vehicle with a swinging-sliding door according to the prior art.

FIG. 1 shows, in a schematic sketch, a rail vehicle 1 with a door 2, the door 2 has two door leaves 3 which are illustrated in the closed position. In accordance with the prior art, a light 4, indicated purely schematically, is mounted on the vehicle 1 above the door frame. The light 4 has all of the above-mentioned disadvantages of the prior art.

Figure 2:
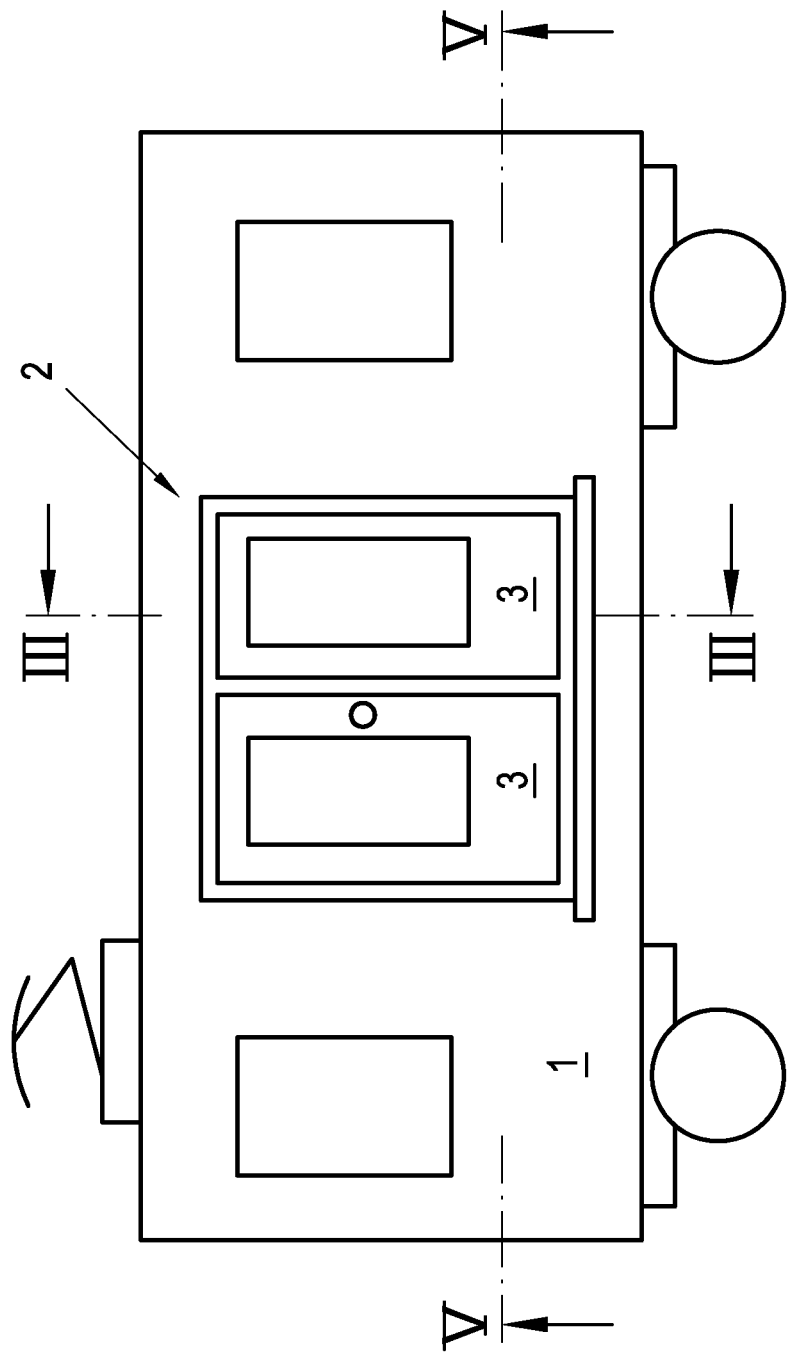
FIG. 2 shows an analogous view with a door equipped in accordance with the disclosed embodiments.

FIG. 2 is a likewise schematic illustration of a vehicle 1 equipped in accordance with the invention, wherein two intersecting lines and V-V are plotted, using the illustration of which the disclosed embodiments will be explained in more detail.

Figure 3:
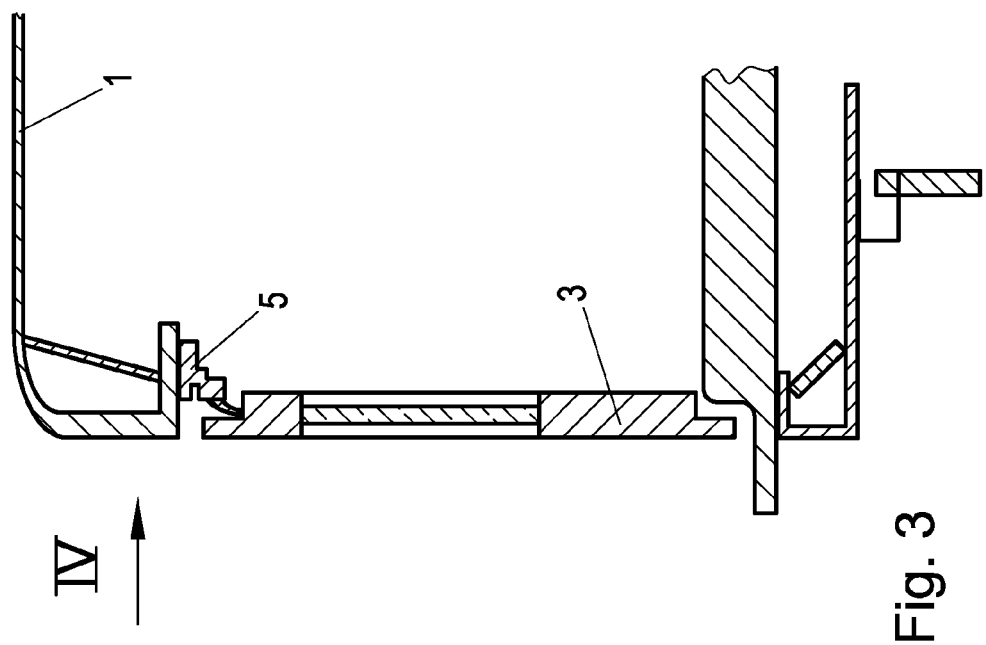
FIG. 3 shows a section along the line from FIG. 2.

FIG. 3 now illustrates, likewise purely schematically, a section along the line of FIG. 2. The door leaf 3 can be seen in the region of the outer wall of the vehicle 1, the door leaf being designed as part of a swinging-sliding door known in a multiplicity of modifications in the prior art, and more rarely as a revolving or hinged revolving door, but at any rate interacting with a frame 5 which is customarily inserted as a unit together with the door leaf/door leaves 3 into the carriage body of the vehicle 1.

Figure 4:
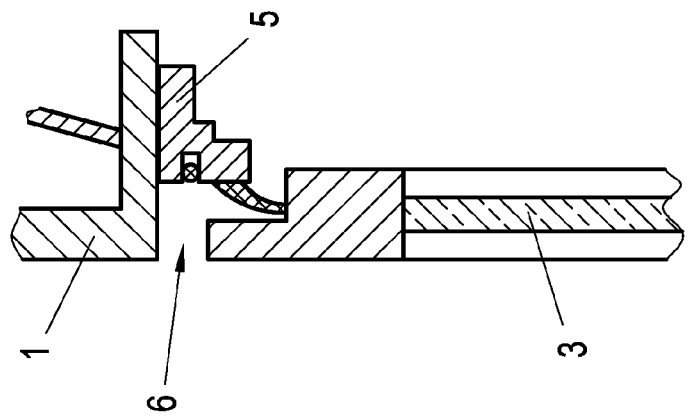
FIG. 4 shows the detail IV from FIG. 3.

According to the disclosed embodiments, an illumination 6 is now provided at least in selected sections of the door frame 5, for example, as illustrated in FIG. 4, in a groove of a profile of the door frame 5.

The illumination 6 particularly may consists of an LED rail or an LED chain, as is commercially available. Illuminating bodies of this type have LEDs which lie one behind another in a line and are supplied via a generally flexible, continuous back part not only with electrical current, but are also held mechanically in the back part. The back part is fastened by means of adhesive or by a form fit or force fit fastening to an underlying surface or simply, as illustrated, in a groove.

Figure 5:
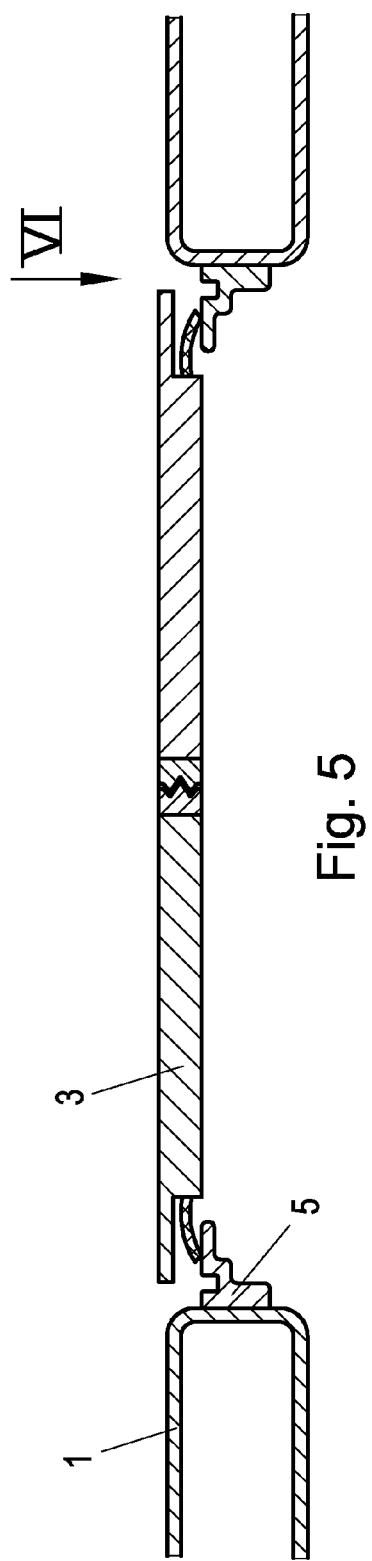
FIG. 5 shows a section along the line V-V from FIG. 2.
Figure 6:
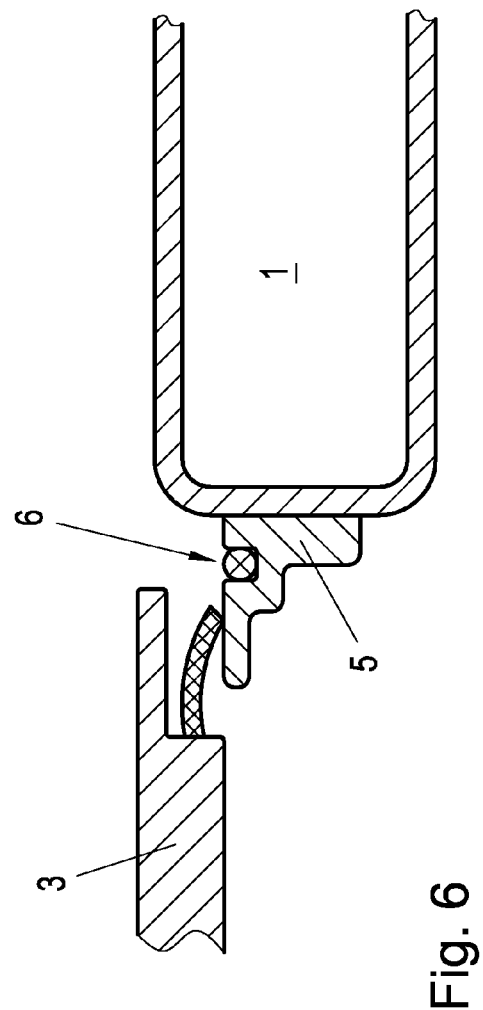
FIG. 6 shows the detail VI from FIG. 5.

FIG. 5 shows, purely schematically, the section V-V of FIG. 2; a detail is also shown here in the viewing direction of the arrow VI as FIG. 6; it is clearly seen that an illumination 6 according to the disclosed embodiments can easily be accommodated here.

Figure 7:
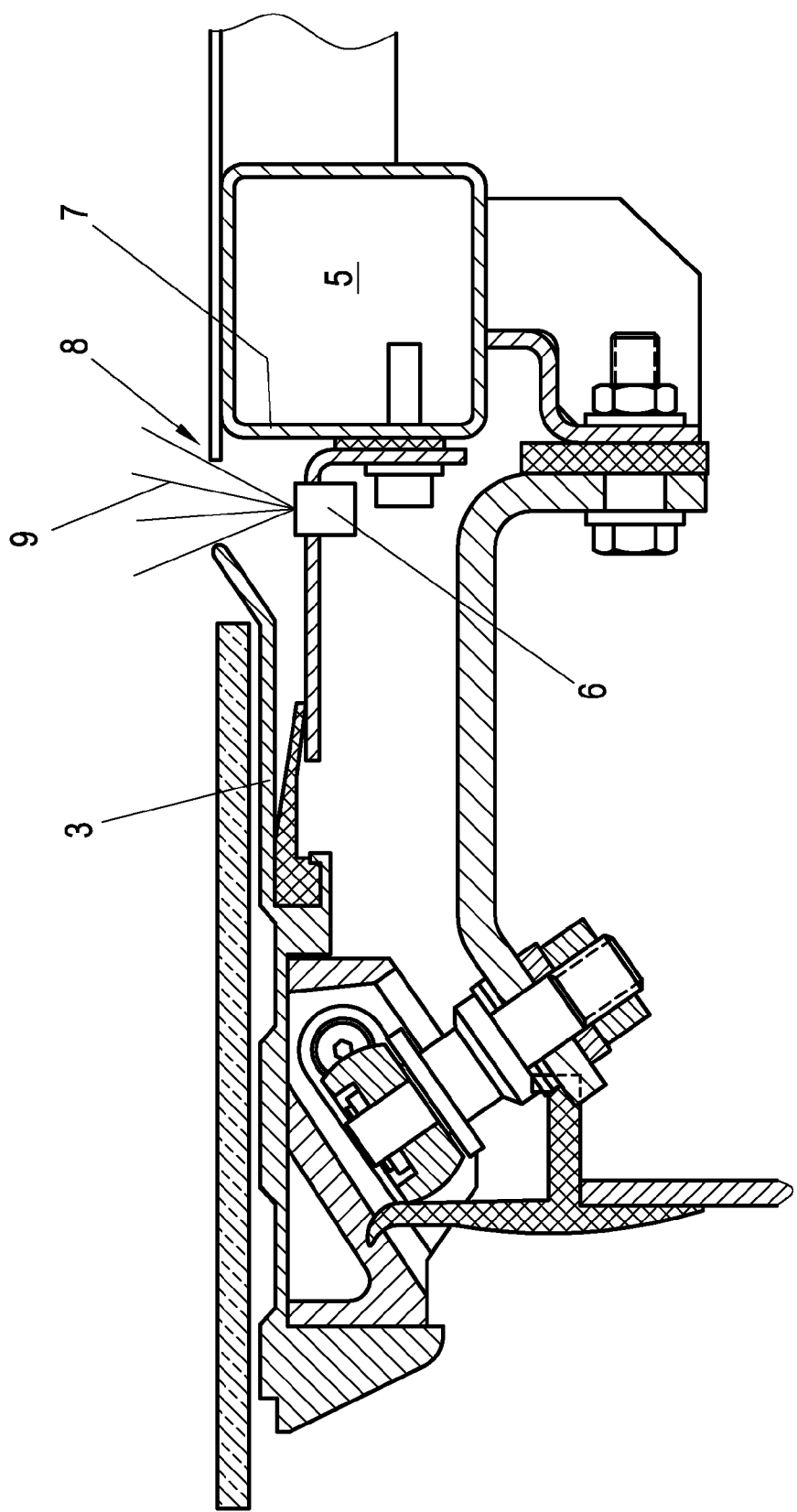
FIG. 7 shows a further detail with the door leaf closed.

FIG. 7 shows, less schematically than the other figures, without entering into the matter of the formation of a groove, an example for the location of the mounting of a LED chain 6 on the door frame 5, the LED chain here firstly being protected and secondly also being visible in the closed state of the door. The state with the door closed is illustrated, the gap 8 which is always present in practice between door leaf 3 and door frame 5 can clearly be seen and the manner of operation is indicated by light beams 9 passing through. If an illumination located particularly in the door plane is desired, the LED chain or a further LED chain can be arranged at the location 7. The operation can take place together or else separately.

LEDs can also be mounted at other locations, for example in the lower region, where they also point toward possible gaps or height differences between carriage body and platform, as far as possible without dazzling, and therefore are best mounted only in the lateral region of the transition, or else also on the door frame 5, in such a manner that they provide more light in the carriage interior, or simply substantially beam in the plane of the door.

The operation of the illumination can take place in diverse ways: as classical illumination in conjunction with the position of the door, possibly coupled to further boundary conditions, such as the brightness in the external region, or the switching state of the interior illumination. A further possibility consists in integrating the previously variously used signal lamps for "closed doors" or for "door defect" by way of LEDs of different colors and/or flashing signs, etc. in the illumination according to the disclosed embodiments. The colors green, red, orange and yellow are particularly appropriate for this purpose. The control is undertaken either via the door controller or the light controller, depending on the objectives and effects sought, and can easily be designed by a person skilled in the art in the field of door technology for vehicles, in particular rail vehicles, with knowledge of the disclosed embodiments.

To this end, the comprehensive document WO 2013/006848 is found in the prior art, the document actually relating to a warning system which indicates the movement of the doors and accordingly requires complicated sensors, controllers and the like. The optical parts of the warning system in this case are, of course, mounted on the door leaves and illuminate the passenger in the face during the opening of the door and are subsequently extinguished. This not only does not contribute anything to safety, but also dazzles the passengers who then grope around even more in the dark. Added to this is the fact that this arrangement of the lighting means requires a complex supply of energy, and that this device can be integrated into existing door leaves only after laborious and costly preparation.

EP 1 533 205 likewise relates to a safety system and makes provision for a multiplicity of lights which indicate the passage region to be mounted on the floor in the door region. Specifically older people who are watching out for the gap between floor and platform are dazzled as a result. The installation in the floor is also complicated when prepared lighting strips are used; the lights themselves are exposed to extremely severe conditions and the greatest possible soiling.

It is known from JP 2007/230380 to provide a door handle rail on a vehicle door with a lighting means to make the public aware of its existence. Whether in particular older people will take hold of and tightly hold on to a flashing part or else merely illuminating part, or whether they will regard this as a warning indication not to come into the vicinity thereof is a question which cannot be answered. The device itself is arranged at a mechanically problematic location (passengers and items of luggage knocking into it, dirt, etc.), and since, furthermore, the constriction of the free cross section is avoided as far as possible in most doors, this concept cannot be put into practice.

LIST OF REFERENCE SIGNS

01 Vehicle
02 Door
03 Door wing
04 Light
05 Door frame
06 Illumination, lighting means
07 Alternative location
08 Gap
09 Light beams

The invention claimed is:

1. An illumination assembly for providing illumination of an entrance of rail vehicle at swinging-sliding doors providing the entrance of the rail vehicle, the assembly comprising:
a door frame;
at least one door leaf; and
at least one lighting means,
wherein the at least one lighting means is positioned in a groove of the door frame at a location at least covered by the door leaf in a closed state of the swinging-sliding doors whereby the at least one lighting means is protected and also visible in the closed state of the swinging-sliding doors,
wherein the at least one lighting means positioning in the groove of the door frame provides illumination of the rail vehicle entrance, not subject to shadowing, and the at least one lighting means does not protrude beyond external contours of the rail vehicle and does not interrupt a smooth outer wall of the rail vehicle, and
wherein the positioning of the at least one lighting means maintains an extent of a light space profile and a free cross section of the open door.

2. The illumination of claim 1, wherein the at least one lighting means is an LED.

3. The illumination of claim 2, wherein the at least one lighting means is an LED strip or LED chain arranged in the groove of the door frame.

4. The illumination of claim 1, further comprising a plurality of lighting means of differing color including the at least one lighting means.

5. The illumination of claim 1, further comprising a door controller, wherein the at least one lighting means is activated via the door controller.

6. The illumination of claim 2, further comprising a plurality of lighting means of differing color including the at least one light means.

7. The illumination of claim 3, further comprising a plurality of lighting means of differing color including the at least one light means.

8. The illumination of claim 3, further comprising a door controller, wherein the at least one lighting means is activated via the door controller.

9. The illumination of claim 4, further comprising a door controller, wherein the at least one lighting means is activated via the door controller.

10. The illumination of claim 2, further comprising a light controller, wherein the at least one lighting means is activated via the light controller.

11. The illumination of claim 3, further comprising a light controller, wherein the at least one lighting means is activated via the light controller.

12. The illumination of claim 4, further comprising a light controller, wherein the at least one lighting means is activated via the light controller.

\* \* \* \* \*